United States Patent

[11] 3,625,344

| [72] | Inventor | Maurice Debeaux<br>Lyon, France |
|---|---|---|
| [21] | Appl. No. | 867,156 |
| [22] | Filed | Oct. 17, 1969 |
| [45] | Patented | Dec. 7, 1971 |
| [73] | Assignee | Rhone-Poulenc S.A.<br>Paris, France |
| [32] | Priority | Oct. 18, 1968 |
| [33] | | France |
| [31] | | 170537 |

[54] ENDLESS BELT CONVEYOR
9 Claims, 3 Drawing Figs.

[52] U.S. Cl. .................................................. 198/192,
198/203
[51] Int. Cl. ...................................................... B65g 15/08
[50] Field of Search ............................................. 198/191,
192, 203

[56] References Cited
UNITED STATES PATENTS

| 2,969,878 | 1/1961 | Finney, Jr. .................... | 198/191 |
| 3,268,065 | 8/1966 | Thomson ....................... | 198/203 |
| 3,381,799 | 5/1968 | Havelka ......................... | 198/191 |

*Primary Examiner*—Gerald M. Forlenza
*Assistant Examiner*—John Mannix
*Attorney*—Stevens, Davis, Miller & Mosher ABSTRACT: A conveyor for continuously receiving a substance and conveying in the liquid state and while it solidifies, in which a conveying endless belt is driven at its upstream end to form a dished portion in its upper run to receive the liquid substance. An auxiliary endless belt is mounted in contact with at least a part of said conveying belt. The linear speed of the driving means at the upstream end of the conveying belt is greater, e.g., 0.1 to 6 percent, than the speed of the auxiliary endless belt.

PATENTED DEC 7 1971

ENDLESS BELT CONVEYOR

The present invention relates to an endless belt conveyor adapted for continuously receiving a substance in the liquid state and for conveying the substance while still liquid and during its transformation to the solid state.

This type of apparatus is useful more particularly in the chemical industry, for carrying out various production processes leading to solidification or gelling of the substance. By way of example, there may be mentioned the production of polyvinyl alcohol described in French Pat. No. 1,042,829.

Processes of this kind can be carried out by means of conveyors of known type on a pilot scale without particular difficulties. However, serious technical difficulties are encountered as soon as the full industrial scale is reached, since the amounts of liquid involved become considerable. In a conventional conveyor, the upper run of the endless belt which supports and entrains the load is tensioned and drawn by the downstream drum. This upper run, which is subjected both to the weight of the load transported and to the tractive force of the conveyor, must necessarily be given excellent mechanical strength, particularly tensile strength. This strength is generally achieved by providing a suitable internal reinforcement. Consequently, it is very difficult with a belt of this kind to form a dished part of sufficient capacity to receive a considerable quantity of the product concerned in the liquid state. It is possible to use an endless belt whose edges are flexible and raised, but even in this way it is not possible to obtain a sufficient hollow immediately after the drum situated at the upstream end of the conveyor, and this then results in lengthening the apparatus excessively. It is possible to incline the conveyor in general relatively to the horizontal, but in addition to the considerable bulk which this necessitates the capacity obtained in this way still remains inadequate. These difficulties are further aggravated by the fact that the materials normally used for the production of endless belts are often incompatible with the substance transported, which may make it necessary to use materials having inferior mechanical characteristics and which are more difficult to use.

According to the present invention there is provided a conveyor for continuously receiving a substance in the liquid state and for conveying the substance while still liquid, and during its transformation to the solid state, such conveyor comprising a liquidtight endless conveying belt, means to drive said conveying belt at its upstream end so that its upper run is driven in a downstream direction to form a dished portion, an auxiliary endless belt mounted within and in contact with at least a part of said conveying belt and means to drive said auxiliary belt in the same direction as, but at a lower speed than, said conveying belt driving means.

Preferably the conveying belt driving means is driven at between percent and and 6 percent greater linear speed than said auxiliary belt.

In order the that the invention may more readily be understood, the following description is given, merely by way of example, reference being made to the accompanying drawings, in which.

Figures 1, 2:
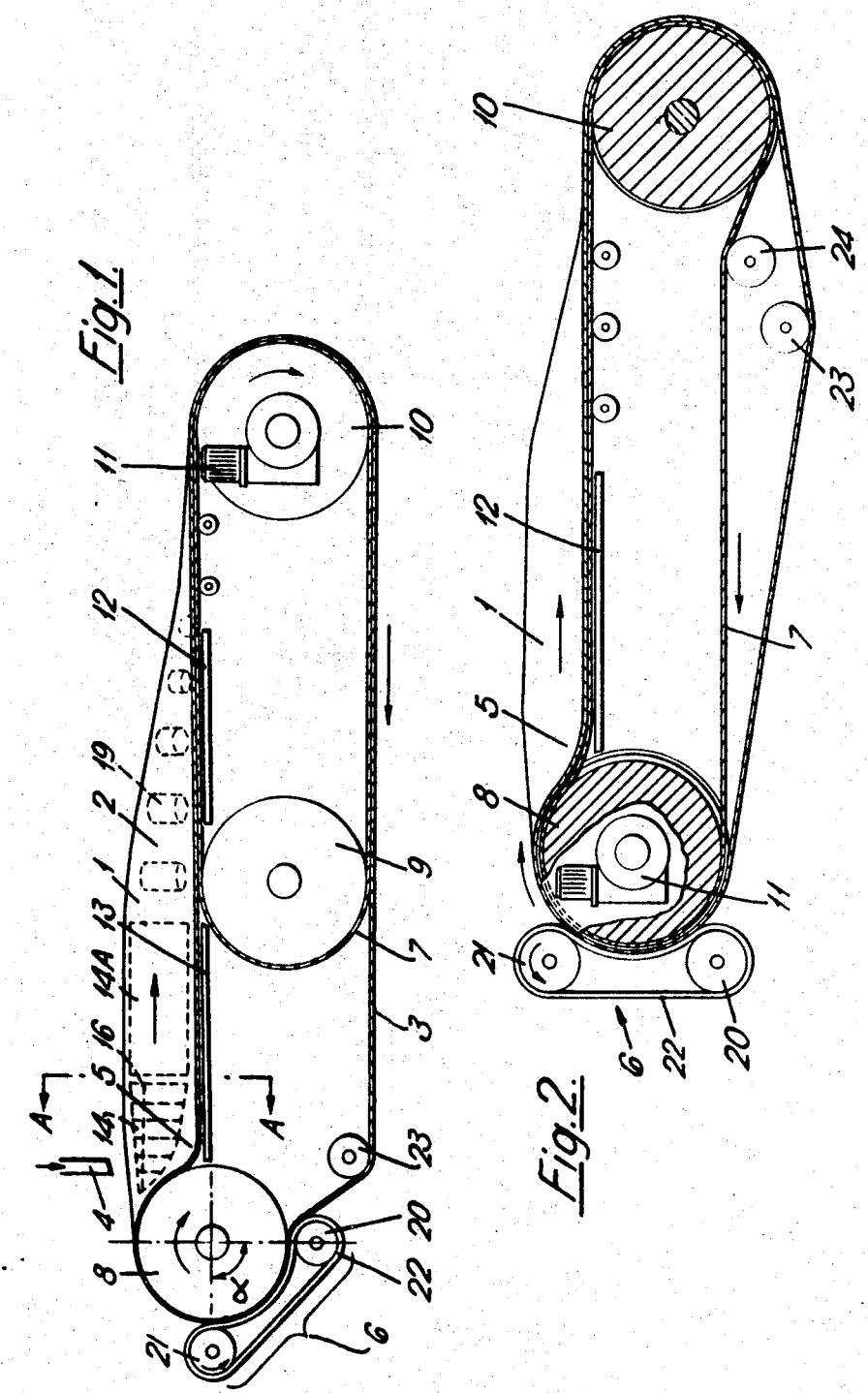
FIG. 1 is a view partly in elevation and partly in section on a vertical plane of a preferred form of conveyor assembly according to the invention.
FIG. 2 is a similar view of a second embodiment.

The conveyor according to the invention comprises an endless conveying belt 1 which moves around an upstream drum 8 and a downstream drum 10. This endless belt 1 comprises an upper run 2 and a lower run 3, each element of the belt, of course, passing successively through the upper run and the lower run. A pipe 4 is used for introducing the substance in the liquid state on to the belt in the immediate vicinity of the drum 8. The upper run 2 sags immediately after having crossed the drum 8 and its edges are raised to form a dished portion 5 which serves to contain the liquid mass until it is transformed into a solid mass, the solidified portion of the substance retaining the liquid at the downstream side. In the dished portion thus formed, the upper run 2 thus transports the substance in the liquid state and during its transformation from the liquid state to the solid state. The upper run is then returned to a substantially flat shape at its downstream portion and solidified substance is easily detached from the endless belt at the downstream end of the conveyor.

The upper run 2 of the conveying belt is supported and driven simultaneously at the upstream end by an appropriate driving device 6 at the head of the conveyor and at the downstream end by an auxiliary endless belt 7.

The drive element of the driving device 6 is the drum 8, which is powered for example, by a geared motor set (not shown), and the conveying belt 1 is wrapped about the drum 8 over an arc whose angle at the center $\alpha$ is preferably between 60° and 180°, although these limits are not obligatory.

The auxiliary belt 7 travels within the conveying belt 1 between two drums and in the embodiments illustrated is looped about the downstream drum 10 of the conveyor. The upper run of the auxiliary belt is itself supported by any appropriate device 12 formed for example by fixed smooth surfaces, or by sets of rollers, or any combination of these two means.

Preferably the linear speed of the driving device at the upstream roller in contact with the conveying belt is 0.1 percent to 6 percent greater than the speed of the auxiliary endless belt.

This slight difference in speeds can be obtained by any conventional means. Thus, by way of example, the auxiliary belt 7 may be driven by a drum in turn driven by a suitable geared motor set. It is also possible to synchronize the rotary movements of the drum 8 and of the drum driving the auxiliary belt 7 by means of a reduction gear and suitable mechanical transmission elements. It is also possible to drive the two endless belts by the same drum 8 machined with two slightly different diameters, the auxiliary belt being looped about the central section of the drum which has been machined with the smaller diameter, and the wider conveying belt being wound both over the auxiliary belt and over the lateral sections of the drum which have been machined to the larger diameter. This arrangement may be used for a conveyor such as that illustrated in FIG. 2.

The tension of the auxiliary belt is regulated on the tensioned run by any suitable means; for example on the conveyor illustrated in FIG. 1 by displacement of the roller 9 in the upstream sense, and on the conveyor illustrated in FIG. 2 by displacement of the roller 24.

The endless conveying belt 1, having a specific length, the size of the dished portion 5 can be varied optionally by regulating the useful length of the upper run 2 by acting on the length of the tensioned run 3, for example by suitable displacement of a roller 23.

The arrangements described make it possible to:
1. Regulate the difference in speeds between the driving device 6 and the auxiliary belt 7 so that the upper run 2 of the conveying belt is the slack belt. This run, detensioned, readily forms a dished portion immediately downstream of the upstream roller 8.
2. Relieve the upper run of the conveying belt 1 from the stress due to the weight of the substance carried, this upper run being supported and driven by the auxiliary endless belt 7, at least for the greater part, and therefore the stress is simply transmitted to the auxiliary belt.
3. Exert a tractive force on the conveying belt 1 only by the driving device 6 situated at the head or upstream end of the conveyor, since this device rotates more quickly than the auxiliary belt 7. This device 6 exerts a tractive force only on the lower run 3 of the conveying belt; since this run is not loaded this tractive force is slight.
4. Provide the tractive force in the upper run of the conveying belt substantially entirely by means of the auxiliary belt 7.

In order that the upper run of the auxiliary belt 7 can convey the substance contained in the conveying belt 1 with the minimum of wear and deformation, rotary driving means are connected fast to the downstream drum of the auxiliary belt.

Although the adhesion of the upper run of the conveying belt to the auxiliary belt is easily obtained by virtue of the weight of the transported substance, it is advantageous to reinforce this adhesion further by taking the belts 1 and 7 over the downstream drum 10 simultaneously Since this drum 10 provides substantially all the conveying force for the substance conveyed, generally a geared motor set of suitable power is connected directly to this drum, and the roller 8 is driven by a simple mechanical transmission.

In order to obtain better driving of the conveying belt 1, while limiting the stress on the lower run 3, the driving device 6 includes two rollers 20 and 21, the roller 21 being driven synchronously with the drum 8 at the same circumferential speed for example by a set of gearwheels (not shown). At least one endless belt 22 is arranged around these two rollers, so that the conveying belt 1 is perfectly held between two equally tractive surfaces, that of the roller 8 and that of the belt 22. The tension of the belt 22 is regulated for example by regulating the distance of the roller 20 from the roller 21, in order to obtain the necessary slip of the conveying belt on the roller 8.

In order to reduce further the stress acting on the conveying belt, it is possible advantageously to control precisely, by means of a suitable supporting element, the deformation of the slack run 2 forming the dished portion downstream of the roller 8.

The supporting elements for the central portion of the conveying belt are constituted immediately downstream of the drum 8 by a smooth fixed support 13 which is generally flat or slightly concave. These elements extend as far as the auxiliary belt 7 and support the conveying belt in the zone where the latter contains the substance in the liquid state, without imparting shaking or vibrating movements thereto. It is in fact often important not to subject the substance carried to any movement, even a minimal movement, while it is in the liquid state.

The supporting elements for the lateral portions of the conveying belt are distributed over three successive zones in the downstream direction.

In the first zone, which receives the liquid, the supporting elements 14 gradually raise above the horizontal the lateral walls of the conveying belt until the suitable angle of inclination $\theta$ is obtained, which is preferably between 30° and 90°. Experience shows that in order to avoid folding the conveying belt laterally, the length of this zone should be at least equal to ¾ of the width of the conveying belt.

In the second zone, where the substance is transformed into the solid state from the liquid state, the supporting elements 14A hold the lateral walls of the conveying belt raised with a constant inclination. These elements are generally constituted by fixed, smooth surfaces.

In the third zone, where the substance is substantially in the solid state and where the central portion of the reception belt is supported by the auxiliary belt 7, the lateral supporting elements 19 are generally constituted by a series of wheels which can rotate on themselves or by any equivalent device; these elements gradually return the edges of the conveying belt to the horizontal. The length of this zone is not of critical importance.

Figure 3:
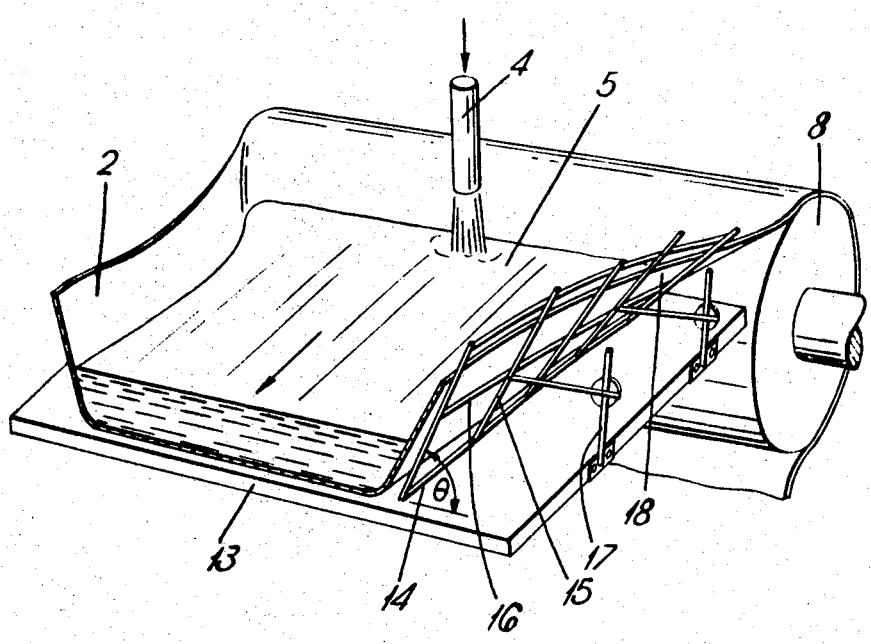
FIG. 3 shows a perspective sectional view taken on the line A—A of FIG. 1.

FIG. 3 shows details of the construction of the supporting elements and their arrangement in the vicinity of the drum 8. The supporting elements 14 are formed by rods 15 fixed by longitudinal elements 16 and assembled with supports 17 which are advantageously regulatable in the three dimensions in accordance with known techniques. These elements support a continuous sheet 18 on which the upper run 2 of the belt 1 slides. A wall of this kind can advantageously be made deformable by simple pressure of the conveying belt when under load. This makes it possible to balance the pressures to which it is subjected and prevents subjecting the belt to stresses liable to form detrimental folds.

By way of alternative forms of the supporting element, one can use, for example, a sheet which may be flat, corrugated, honeycombed, curved with an experimentally determined profile, made of metal or plastics material, for example polyethylene, a set of rigid tubes or strips arranged in planes perpendicular to the axis of the conveyor and held at their ends by deformable elements, or any other equivalent device, these supporting elements being self-supporting or held by a suitable framework.

As the conveying belt one can use any belt which is sealing tight to the liquid to be transported, even one with low mechanical strength. For example thin belts, which may or may not be reinforced internally, may or may not be elastic, with or without a covering which is a conductor of static electricity, are suitable. These belts may be made, e.g., of polyvinyl chloride, polyethylene, polytetrafluorethylene or silicone elastomer. Preferably materials are chosen from which the substance to be transported can generally be easily detached.

As the auxiliary belt, there may be used any belt having suitable mechanical characteristics which are compatible with any vapors accompanying the transported substance. For example, this belt may be made of rubber, silicone elastomer or polyvinyl chloride, reinforced with filaments or cloths made of metal, cotton, artificial or synthetic fibers.

The conveyor shown in FIG. 2 includes some modifications and comprises an auxiliary endless belt 7 rotating between two drums 8 and 10, and driven by the drum 8. The upper run of the auxiliary belt is the slack run, and is supported by devices 12 provided in the zone where the transported substance is in the liquid state in the form of a fixed smooth surface and then, in the zone where the substance is in the solid state, in the form of sets of rollers. The tension of the auxiliary belt is regulated for example by means of a roller 24. The auxiliary endless belt is covered by the endless conveying belt 1, which is supported and driven simultaneously by the auxiliary belt and also by the driving device 6 at the head of the conveyor, constituted by the drum 8 and by the belt 22 rotating between the rollers 20 and 21. The drum 8 is machined with two slightly different diameters so that the speed at which the conveying belt is driven by the driving device 6 is 0.1 percent to 6 percent greater than the speed of the auxiliary belt. The tension of the conveying belt is regulated for example by means of a roller 23. The upper run of the conveying belt is the slack run, and thus it is easily possible to raise the edges thereof to form a dished portion 5 by means of suitable profiled fixed supports (not shown) which are introduced laterally between the two endless belts.

In order to increase the capacity of the dished portion, it may be advantageous to give the upper runs of the conveying and auxiliary belts a descending slope towards the downstream direction which is less than 10° relatively to the horizontal and preferably less than 5°, the liquid being retained downstream by the transported material which is in the course of solidification.

Various driving device 6 can also be used for the conveying belt, associating for example only one roller 21 with the drum 8. The auxiliary belt 7 may be composed of a plurality of parallel belts. Heat exchange means capable of cooling or crystallizing the product, may advantageously be used. The conveyor may be arranged within a sealingtight chamber if desired.

The conveyor according to the invention affords notable advantages. The existence of a deep-dished portion permits having a considerable useful volume and a considerable capacity for conveying the substance in the liquid state. The form-retaining ability of the dished portion enables the substance to be transformed to the solid state in a homogeneous and uniform manner. Since on the other hand the conveying belt is not subjected to more than slight stresses, it is possible to use belts of considerable length, which permits of obtaining directly a substance in a large quantity and considerably reduces the bulk of the apparatus for a given capacity, likewise the installation costs. Furthermore, the wear on the conveying belt is very slight, which eliminates substantially all inopportune stopping of the apparatus, and increases the economic advantages and the range of use for this type of apparatus. For this some reason, it is possible to use conveying belts which have only low mechanical strength, which are simple and economical to produce, and which are connected on the site for example by simple welding. It is also possible to use endless belts made of expensive material of slight thickness, advantageous owing to some of their properties, such as their chemical inertness.

We claim:

1. A conveyor for continuously receiving a substance in the liquid state and for conveying the substance while still liquid and during its transformation to the solid state, said conveyor comprising, in combination:
   a. a liquidtight endless conveying belt;
   b. an upstream and a downstream end to said conveying belt;
   c. an upper run and a lower run to said conveying belt;
   d. an auxiliary belt mounted within and in contact with at least the downstream part of said conveying belt, said auxiliary belt providing substantially the entire traction force in the conveying belt;
   e. means for drive of said auxiliary belt at a given speed;
   f. means at said upstream end effective to drive said upper run towards said downstream end and to form a dished portion to said upper run, said means being driven at a linear speed greater than that of said auxiliary belt; and
   g. supporting means effective to support side portions of said upper run to define said dished portion to said upper run.

2. The conveyor defined in claim 1, wherein the means to drive said conveying belt are driven at a linear speed of between 0.1 percent and 6 percent greater than the linear speed of said auxiliary belt.

3. The conveyor defined in claim 1, and further comprising a first drum at the upstream end of said conveyor and a second drum at the downstream end of said conveyor, said conveying belt passing around said first and second drums.

4. The conveyor defined in claim 3, wherein said auxiliary endless belt is passed around the second of said drums only.

5. The conveyor defined in claim 4, wherein said drum forms the drive means for said auxiliary endless belt.

6. The conveyor defined in claim 3, wherein said first drum comprises two axially outer portions of the same diameter and a central portion of reduced diameter, wherein said auxiliary endless belt passes around said central portion of said first drum and around said second drum, and wherein said endless conveying belt passes around said axially outer portion and in contact with said auxiliary endless belt at said first drum.

7. The conveyor defined in claim 6, and further comprising a driving belt located adjacent said first drum and in contact with said endless conveying belt as it passes around said first drum, effective to drive said auxiliary endless belt and said conveying endless belt.

8. The conveyor defined in claim 1, and further comprising support means effective to support said upper run between the upstream and downstream ends thereof.

9. The conveyor defined in claim 1, and further comprising tensioning means operative on said lower run effective to tension said conveying endless belt.

* * * * *